US006713041B1

(12) United States Patent
Moscoso et al.

(10) Patent No.: US 6,713,041 B1
(45) Date of Patent: Mar. 30, 2004

(54) CRYSTALLINE ALUMINOSILICATE ZEOLITIC COMPOSITION: UZM-9

(75) Inventors: Jaime G. Moscoso, Mt. Prospect, IL (US); Gregory J. Lewis, Mt. Prospect, IL (US); Jana L. Gisselquist, Evanston, IL (US); Mark A. Miller, Niles, IL (US); Lisa M. Rohde, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/074,612

(22) Filed: Feb. 12, 2002

(51) Int. Cl.⁷ ............................................. C01B 39/14
(52) U.S. Cl. ..................... 423/705; 423/706; 423/708; 423/718; 423/DIG. 24; 423/707
(58) Field of Search ................ 423/705, 706, 423/707, 708, 718, DIG. 24

(56) References Cited

U.S. PATENT DOCUMENTS

| | | | |
|---|---|---|---|
| 2,882,243 A | 4/1959 | Milton | |
| 3,306,922 A | 2/1967 | Barrer et al. | |
| 3,314,752 A | 4/1967 | Kerr | |
| 3,321,272 A * | 5/1967 | Kerr | 423/709 |
| 3,375,205 A | 3/1968 | Wadlinger et al. | |
| 4,205,053 A * | 5/1980 | Rollmann et al. | 423/703 |
| 4,299,686 A * | 11/1981 | Kuehl | 208/111.15 |
| 4,610,856 A | 9/1986 | Skeels et al. | |
| 5,171,556 A * | 12/1992 | Caullet et al. | 423/705 |
| 5,785,947 A * | 7/1998 | Zones et al. | 423/705 |
| 6,558,647 B2 * | 5/2003 | Lacombe et al. | 423/702 |

OTHER PUBLICATIONS

Fyfe et al. in *J. Chem. Soc., Chem. Commun.*, 1093–1094 (1984).

* cited by examiner

Primary Examiner—David R Sample
(74) Attorney, Agent, or Firm—John G. Tolomei; Frank S. Molinaro

(57) ABSTRACT

Applicants have synthesized a new aluminosilicate zeolite identified as UZM-9. This new zeolite has the LTA topology and has an empirical formula of:

$$M_m^{n+}R_r^{p+}Al_{1-x}E_xSi_yO_z$$

where M is an alkali or alkaline earth metal ion, R is at least two organic ions, at least one of which has an organic group with at least two carbon atoms and E can be gallium, iron, boron and mixtures thereof. The Si/Al ratio can range from greater than 3.5 to about 6.0.

14 Claims, 1 Drawing Sheet

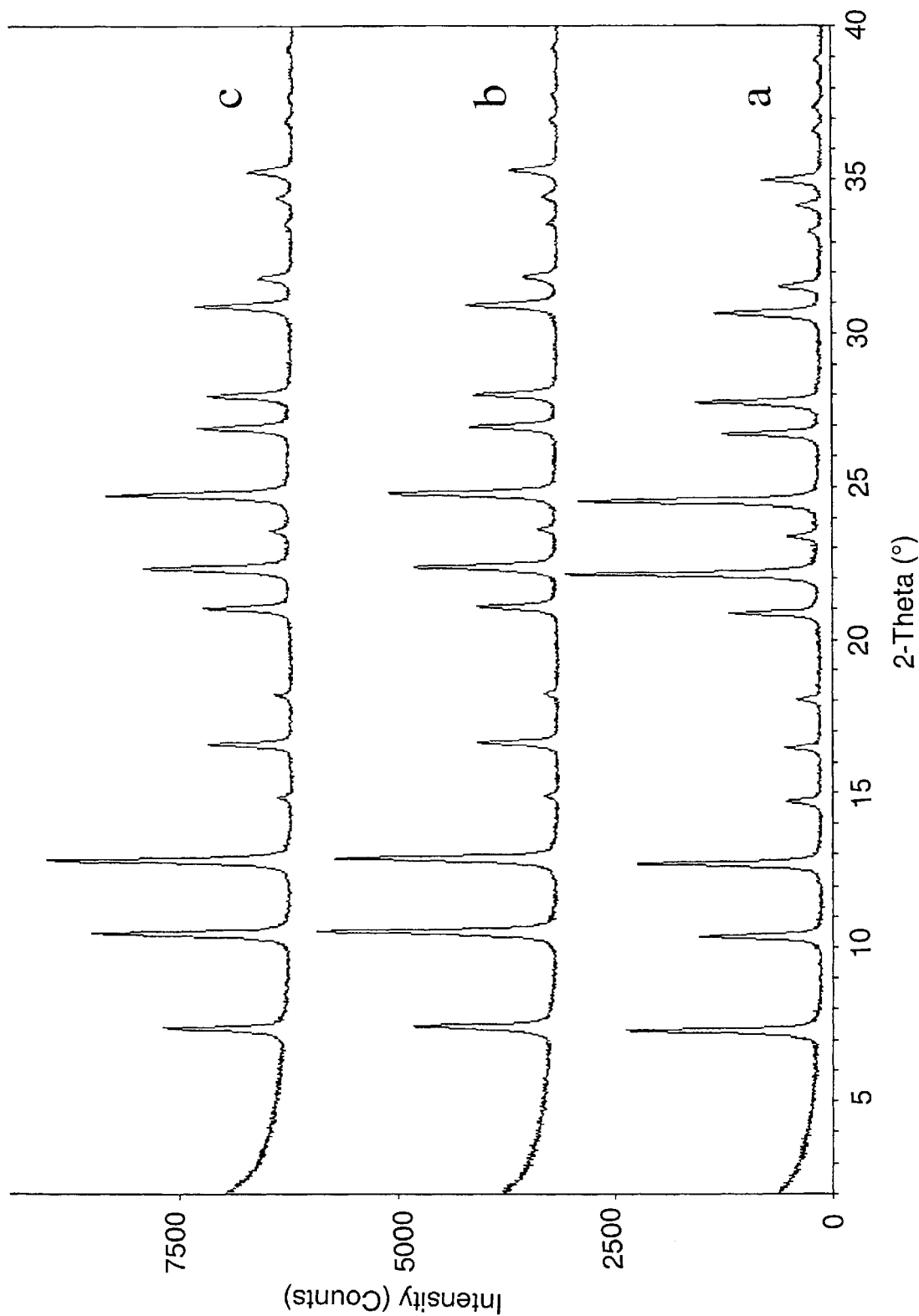

CRYSTALLINE ALUMINOSILICATE ZEOLITIC COMPOSITION: UZM-9

FIELD OF THE INVENTION

This invention relates to an aluminosilicate zeolite designated UZM-9 having the LTA topology, but which is thermally stable in an acidic form and has high Si/Al ratio in the range of greater than 3.5 to about 6.0. The zeolite can be used as an adsorbent or an acid catalyst.

BACKGROUND OF THE INVENTION

Zeolites are crystalline aluminosilicate compositions which are microporous and which consist of a negatively charged framework formed from corner sharing $AlO_2$ and $SiO_2$ tetrahedra. The negative framework charge is balanced by cations, which usually reside in the pores. Numerous zeolites, both naturally occurring and synthetically prepared are used in various industrial processes. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure.

One particular zeolite, designated zeolite A, was first disclosed in U.S. Pat. No. 2,882,243. The '243 patent states that zeolite A has a Si/Al molar ratio of 0.67 to 1.17. U.S. Pat. No. 3,306,922 discloses a zeolite N-A which is identified as an ammonium or alkyl ammonium containing zeolite of LTA topology. The Si/Al ratio is stated to be in the range of 1.25 to 3.0. U.S. Pat. No. 3,314,752 discloses a zeolite identified as ZK-4 which is stated to be zeolite LTA topology with a mixture of methyl ammonium ion or hydronium ion and sodium or potassium. The Si/Al ratio in ZK-4 is stated to be between 1.25 and 2.0. In U.S. Pat. No. 3,375,205 a zeolite Alpha is disclosed which has the zeolite A type lattice but has a Si/Al ratio of greater than 2 to 3.5. Treatment of N-A by ammonium fluorosilicate to increase the Si/Al ratio is disclosed in U.S. Pat. No. 4,610,856. However, substantial loss in crystallinity (see, column 29, lines 1 to 35) with only a small increase in the Si/Al ratio (2.76 to 3.79) is reported. Finally, Fyfe et al. in *J. Chem. Soc., Chem. Commun.*, 1093–1094 (1984) report dealumination of zeolite ZK-4, but with the formation of amorphous material.

In contrast to the above references, applicants have prepared a zeolite designated UZM-9 which has the zeolite A topology (LTA), but has a Si/Al ratio of greater than 3.5 to 6 in its as synthesized form. The UZM-9 can also be prepared with organoammonium cations larger than tetramethylammonium. Finally, UZM-9 is stable to calcination up to at least 600° C. and is useful as a catalyst in its acid form.

SUMMARY OF THE INVENTION

As stated, the present invention relates to a new aluminosilicate zeolite designated UZM-9. Accordingly, one embodiment of the invention is a microporous crystalline zeolite having a three-dimensional framework of at least $AlO_2$ and $SiO_2$ tetrahedral units and an empirical composition on an as synthesized and anhydrous basis expressed by an empirical formula of:

$$M_m^{n+}R_r^{p+}Al_{1-x}E_xSi_yO_z$$

where M is at least one exchangeable cation selected from the group consisting of alkali and alkaline earth metals, "m" is the mole ratio of M to (Al+E) and varies from 0 to about 0.95, R is at least two organic cations selected from the group consisting of quaternary ammonium ions, diquaternary ammonium ions, protonated amines, protonated alkanolamines and quaternized alkanolammonium ions and further where at least one of said organic cations contains an organic group having at least two carbon atoms, "r" is the mole ratio of R to (Al+E) and has a value of about 0.5 to about 1.5, "n" is the weighted average valence of M and has a value of about 1 to about 2, "p" is the weighted average valence of R and has a value of about 1 to about 2, E is an element selected from the group consisting of gallium, iron, boron and mixtures thereof, "x" is the mole fraction of E and has a value from 0 to about 0.5, "y" is the mole ratio of Si to (Al+E) and varies from greater than 3.5 to about 6 and "z" is the mole ratio of O to (Al+E) and has a value determined by the equation:

$$z=(m \cdot n + r \cdot p + 3 + 4 \cdot y)/2$$

and is characterized in that it has the x-ray diffraction pattern having at least the d spacings and intensities set forth in Table A.

TABLE A

| 2-θ | d(Å) | I/I₀ % |
|---|---|---|
| 7.30–7.42 | 11.9–12.1 | m–vs |
| 10.3–10.52 | 8.4–8.58 | m–s |
| 12.65–12.86 | 6.88–6.99 | w–s |
| 14.61–14.85 | 5.96–6.06 | w–m |
| 16.37–16.65 | 5.32–5.41 | w–m |
| 20.74–21.03 | 4.22–4.28 | w–m |
| 21.98–22.38 | 3.97–4.04 | m–vs |
| 23.2–23.64 | 3.76–3.83 | w |
| 24.37–24.78 | 3.59–3.65 | vs |
| 26.51–27.00 | 3.3–3.36 | m |
| 27.51–28.04 | 3.18–3.24 | w–m |
| 30.48–30.81 | 2.9–2.93 | m |
| 31.36–31.82 | 2.81–2.85 | w–m |
| 32.17–33.80 | 2.65–2.78 | w |
| 33.80–34.60 | 2.59–2.65 | w |
| 34.6–35.31 | 2.54–2.59 | w–m |
| 36.19–37.12 | 2.42–2.48 | w |
| 36.96–37.77 | 2.38–2.43 | w |
| 44.83–45.79 | 1.98–2.02 | w–m |
| 48.1–48.93 | 1.86–1.89 | w |
| 48.65–49.5 | 1.84–1.87 | w |

Another embodiment of the invention is a process for preparing the crystalline microporous zeolite described above. The process comprises forming a reaction mixture containing reactive sources of M, R, Al, Si and optionally E at a temperature of about 60° C. to about 175° C., the reaction mixture having a composition expressed in terms of mole ratios of the oxides of:

$$aM_{2/n}O:bR_{2/p}O:1-cAl_2O_3:cE_2O_3:dSiO_2:eH_2O$$

where "a" has a value of 0.0 to about 1.50, "b" has a value of about 1.0 to about 25, "c" has a value of 0 to about 0.5, "d" has a value of about 4 to about 50 and "e" has a value of about 25 to about 15000.

Yet another embodiment of the invention is a hydrocarbon conversion process using the above-described zeolite. The process comprises contacting the hydrocarbon with the zeolite at conversion conditions to give a converted hydrocarbon.

These and other objects and embodiments will become clearer after a detailed description of the invention.

BRIEF DESCRIPTION OF THE DRAWING

The FIGURE presents x-ray diffraction patterns for: a) as synthesized UZM-9 containing Na, TMA, DEDMA and TEA ions; b) UZM-9 containing Na and H+ ions and c) UZM-9 containing only H+ ions.

DETAILED DESCRIPTION OF THE INVENTION

This invention relates to aluminosilicate zeolites and substituted versions of the same whose topological structure is related to LTA as described in *Atlas of Zeolite Framework Types*, W. H. Meier, D. H. Olson, and C. H. Baerlocher, editors, Elsevier, (2001), 169–169, which has been designated UZM-9. As will be shown in detail, UZM-9 is different from N-A, ZK-4, and zeolite alpha, which also have the LTA structure, in a number of its characteristics. One aspect of UZM-9 that differs from these other zeolites is the composition, which in its as-synthesized form and on an anhydrous basis has an empirical formula of:

$$M_m^{n+}R_r^{p+}Al_{1-x}E_xSi_yO_z$$

In the above equation, M represents at least one exchangeable cation and is selected from the group consisting of alkali and alkaline earth metals. Specific examples of the M cations include but are not limited to lithium, sodium, potassium, rubidium, cesium, calcium, strontium, barium and mixtures thereof. R is at least two organic cations each of which is selected from the group consisting of quaternary ammonium ions, diquaternary ammonium ions, protonated amines, protonated alkanolamines and quaternized alkanolammonium ions. It is also a requirement that at least one of the organic cations contains an organic group having at least two carbon atoms, e.g. trimethylethyl ammonium ion. Preferred organic cations are quaternary and diquaternary ammonium ions. Non-limiting examples of quaternary ammonium ions are tetramethyl, tetraethyl, methyltriethyl, diethyl-dimethyl etc. ammonium ions. Non-limiting examples of diquaternary ammonium ions are hexamethonium, pentamethonium, decamethonium, etc, ions. The value of "n" which is the weighted average valence of M varies from about 1 to about 2. The value of "p" which is the weighted average valence of R varies from 1 to about 2. The ratio of M to (Al+E) is represented by "m", which varies from 0 to about 0.95, while "r" is the ratio of R to (Al+E) and varies from about 0.5 to about 1.5. The ratio of silicon to (Al+E) is represented by "y" which varies from greater than 3.5 to about 6.0. E is an element, which is tetrahedrally coordinated, is present in the framework and is selected from the group consisting of gallium, iron and boron. The mole fraction of E is represented by "x" and has a value from 0 to about 0.5, while "z" is the mole ratio of O to (Al+E) and is given by the equation $$z=(m \cdot n+r \cdot p+3+4 \cdot y)/2.$$

where M is only one metal, then the weighted average valence is the valence of that one metal, i.e. +1 or +2. However, when more than one M metal is present, the total amount of $$M_m^{n+}=M_{m1}^{(n1)+}+M_{m2}^{(n2)+}+M_{m3}^{(n3)+}+\ldots$$

and the weighted average valence "n" is given by the equation:

$$n = \frac{m_1 \cdot n_1 + m_2 \cdot n_2 + m_3 \cdot n_3 + \cdots}{m_1 + m_2 + m_3 \cdots}$$

Similarly when only one R organic cation is present, the weighted average valence is the valence of the single R cation, i.e., +1 or +2. When more than one R cation is present, the total amount of R is given by the equation:

$$R_r^{p+}=R_{r1}^{(p1)+}+R_{r2}^{(p2)+}+R_{r3}^{(p3)+}$$

and the weighted average valence "p" is given by the equation $$p = \frac{p_1 \cdot r_1 + p_2 \cdot r_2 + p_3 \cdot r_3 + \cdots}{r_1 + r_2 + r_3 + \cdots}$$

The microporous crystalline zeolite, UZM-9, is prepared by a hydrothermal crystallization of a reaction mixture prepared by combining reactive sources of M, R, aluminum, silicon and optionally E. The sources of aluminum include but are not limited to aluminum alkoxides, precipitated aluminas, aluminum metal, aluminum salts and alumina sols. Specific examples of aluminum alkoxides include, but are not limited to aluminum ortho sec-butoxide and aluminum ortho isopropoxide. Non-limiting sources of silica include but are not limited to tetraethylorthosilicate, colloidal silica, precipitated silica and alkali silicates. Sources of the E elements include but are not limited to alkali borates, boric acid, precipitated gallium oxyhydroxide, gallium sulfate, ferric sulfate, and ferric chloride. Sources of the M metals include the halide salts, nitrate salts, acetate salts, and hydroxides of the respective alkali or alkaline earth metals. R sources include without limitation the hydroxide, carbonate, acetate, chloride, bromide, iodide and fluoride compounds. Specific examples include without limitation tetramethylammonium hydroxide, tetraethylammonium hydroxide, hexamethonium bromide, diethyldimethylammonium hydroxide, tetramethylammonium chloride, choline chloride, and methyltriethylammonium hydroxide.

The reaction mixture containing reactive sources of the desired components can be described in terms of molar ratios of the oxides by the formula:

$$aM_{2/n}O:bR_{2/p}O:1-cAl_2O_3:cE_2O_3:dSiO_2:eH_2O$$

where "a" varies from about 0 to about 1.5, "b" varies from about 1.0 to about 25, "c" varies from 0 to 0.5, "d" varies from about 4 to about 50, and "e" varies from about 25 to about 15000. If alkoxides are used, it is preferred to include a distillation or aging step to remove the alcohol hydrolysis products. The reaction mixture is now reacted at a temperature of about 60° C. to about 175° C. and preferably from about 75° C. to about 150° C. for a period of about 1 day to about 4 weeks and preferably for a time of about 2 days to about 10 days in a sealed reaction vessel under autogenous pressure. After crystallization is complete, the solid product is isolated from the heterogeneous mixture by means such as filtration or centrifugation, and then washed with deionized water and dried in air at temperatures from ambient up to about 100° C.

With respect to other LTA type zeolites, the reaction mixture for preparing the UZM-9 of this invention differs in several ways. First, as mentioned above a mixture of organic cations is required and additionally one organic cation having at least one organic group with greater than one carbon, e.g. ethyl. Other differences in the reaction mixtures are presented in Table B for the case where one of the required organic cations (R) is TMA.

TABLE B

Comparison of Reaction Mixture Compositions for Various Zeolites

| | Zeolite | | | |
|---|---|---|---|---|
| Parameter | N-A* | ZK-4* | Alpha* | UZM-9[1] |
| Si/Al | >2.0–5.0 | 1.25–5.5 | 7.5–30 | 7.0–20 |
| TMA/Al | 1.5–3.5 | 2.50–10.74 | 5.25–59.4 | 0.5–1 |
| OH⁻/Si | 0.5–0.7 | 2.0–4.0 | 1.0–2.0 | 0.5–0.84 |

*Values taken from the respective patents
[1]Values from examples

From Table B it is observed that UZM-9 forms at a lower $OH^-/Si$ ratio, a lower TMA/Al ratio or both. The UZM-9 aluminosilicate zeolite, which is obtained from the above-described process, is characterized by the x-ray diffraction pattern, having at least the d-spacings and relative intensities set forth in Table A below.

TABLE A

| 2-θ | d(Å) | I/I₀ |
|---|---|---|
| 7.30–7.42 | 11.9–12.1 | m–vs |
| 10.3–10.52 | 8.4–8.58 | m–s |
| 12.65–12.86 | 6.88–6.99 | w–s |
| 14.61–14.85 | 5.96–6.06 | w–m |
| 16.37–16.65 | 5.32–5.41 | w–m |
| 20.74–21.03 | 4.22–4.28 | w–m |
| 21.98–22.38 | 3.97–4.04 | m–vs |
| 23.2–23.64 | 3.76–3.83 | w |
| 24.37–24.78 | 3.59–3.65 | vs |
| 26.51–27.00 | 3.3–3.36 | m |
| 27.51–28.04 | 3.18–3.24 | w–m |
| 30.48–30.81 | 2.9–2.93 | m |
| 31.36–31.82 | 2.81–2.85 | w–m |
| 32.17–33.80 | 2.65–2.78 | w |
| 33.80–34.60 | 2.59–2.65 | w |
| 34.6–35.31 | 2.54–2.59 | w–m |
| 36.19–37.12 | 2.42–2.48 | w |
| 36.96–37.77 | 2.38–2.43 | w |
| 44.83–45.79 | 1.98–2.02 | w–m |
| 48.1–48.93 | 1.86–1.89 | w |
| 48.65–49.5 | 1.84–1.87 | w |

In addition to being characterized by the above x-ray diffraction pattern, the UZM-9 of the present invention has a composition which is different than that of other zeolites having the LTA topology. These differences are presented in Table C below for the case where "x" is zero.

TABLE C

Comparison of Composition of Various Zeolites

| | Zeolite | | | |
|---|---|---|---|---|
| Parameter | N-A* | ZK-4* | Alpha* | UZM-9 |
| Si/Al | 1.25–3.0 | 1.25–2.0 | >2.0–3.5 | >3.5–6.0 |
| R/Al | 0.1–1.1 | 0.1–0.3 | 0.2–0.5 | 0.5–1.1 |
| Na/Al | 0–0.9 | 0.7–1.0 | 0.5–0.8 | 0–0.5 |

*Values taken from the respective patents

Table C shows that UZM-9 has a higher Si/Al ratio and often a lower Na/Al ratio and usually a higher organic cation (R)/Al ratio. As is true of other zeolites, UZM-9 has a three-dimensional framework structure comprised of at least $AlO_2$ and $SiO_2$ tetrahedral units and having crystallographically regular channels. Additionally, some of the aluminum in the framework can be substituted by E elements.

As synthesized, the UZM-9 material will contain some of the exchangeable or charge balancing cations in its pores or channels. These exchangeable cations can be exchanged for other cations, or in the case of organic cations, they can be removed by heating under controlled conditions. The resulting organic template free form of the zeolite can then be exchanged with any number of cations for a variety of applications.

Methods used to exchange one cation for another are well known in the art and involve contacting the microporous compositions with a solution containing the desired cation (at molar excess) at exchange conditions. Exchange conditions include a temperature of about 25° C. to about 100° C. and a time of about 20 minutes to about 50 hours. The particular cation (or mixture thereof) which is present in the final product will depend on the particular use and the specific composition being used. The M cation can be exchanged for a different (M') alkali metal or alkaline earth metal, a rare earth metal, an ammonium ion, a hydronium ion and mixtures thereof. Thus, by appropriate calcination and ion exchange one can obtain a UZM-9 material with only one type of cation, e.g. ammonium or hydronium ion.

The crystalline UZM-9 zeolite of this invention can be used for separating mixtures of molecular species, removing contaminants through ion exchange and catalyzing various processes involving organic substrates. Separation of molecular species can be based either on the molecular size (kinetic diameter) or on the degree of polarity of the molecular species.

The UZM-9 zeolite of this invention can also be used as a catalyst or catalyst support in processes involving organic substrates including without limitation oxygenates and hydrocarbons. Processes involving oxygenates include without limitation methanol to olefins and methanol to gasoline process. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. Nos. 4,310,440 and 4,440,871 which are incorporated by reference. Preferred hydrocarbon conversion processes are those in which hydrogen is a component such as hydrotreating or hydrofining, hydrogenation, hydrocracking, hydrodenitrogenation, hydrodesulfurization, etc.

Hydrocracking conditions typically include a temperature in the range of 400° to 1200° F. (204–649° C.), preferably between 600° and 950° F. (316–510° C.). Reaction pressures are in the range of atmospheric to about 3,500 psig (24,132 kPa g), preferably between 200 and 3000 psig (1379–20,685 kPa g). Contact times usually correspond to liquid hourly space velocities (LHSV) in the range of about 0.1 hr⁻¹ to 15 hr⁻¹, preferably between about 0.2 and 3 hr⁻¹. Hydrogen circulation rates are in the range of 1,000 to 50,000 standard cubic feet (scf) per barrel of charge (178–8,888 std. m³/m³), preferably between 2,000 and 30,000 scf per barrel of charge (355–5,333 std. m³/m³). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the UZM-9 composition using feedstocks such as gas oils, heavy naphthas, deasphalted crude oil residua, etc. with gasoline being the principal desired product. Temperature conditions of 850° to 1100° F., LHSV values of 0.5 to 10 $hr^{-1}$ and pressure conditions of from about 0 to 50 psig are suitable.

Alkylation of aromatics usually involves reacting an aromatic, especially benzene, with a monoolefin ($C_2$ to $C_{12}$) to produce a linear alkyl substituted aromatic. The process is carried out at an aromatic: olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig. Further details on apparatus may be found in U.S. Pat. No. 4,870,222 which is incorporated by reference.

Alkylation of isoparaffins with olefins to produce alkylates suitable as motor fuel components is carried out at temperatures of −30° to 40° C., pressures from about atmospheric to about 6,894 kPa (1,000 psig) and a weight hourly space velocity (WHSV) of 0.1 to about 120 $hr^{-1}$. Details on paraffin alkylation may be found in U.S. Pat. Nos. 5,157,196 and 5,157,197, which are incorporated by reference.

The x-ray diffraction patterns presented in the following examples were obtained using standard x-ray powder diffraction techniques. The radiation source was a high-intensity, x-ray tube operated at 45 kV and 35 ma. The diffraction pattern from the copper K-alpha radiation was obtained by appropriate computer based techniques. Flat compressed powder samples were continuously scanned at 2° to 70° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art the determination of parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100×I/$I_o$, the above designations are defined as:

w=0–15; m=15–60; s=60–80 and vs=80–100

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

EXAMPLES

The following abbreviations will be used in the examples:

| | |
|---|---|
| Al (Oi-Pr)$_3$ | aluminum isopropoxide |
| Al (Osec-Bu)$_3$ | aluminum sec-butoxide |
| DEDMAOH | diethyldimethylammonium hydroxide |
| MTEAOH | methyltriethylammonium hydroxide |
| HM | hexamethonium |
| TEAOH | tetraethylammonium hydroxide |
| TEOS | tetraethylorthosilicate |
| TMACl | tetramethylammonium chloride |
| TPAOH | tetrapropylammonium hydroxide |

Example 1

An aluminosilicate reaction mixture was prepared by first mixing 117.76 g of aluminum sec-butoxide (95+%) and a combination of 603.48 g TEAOH solution (35%) and 568.95 g of DEDMAOH solution (20%) with vigorous stirring. To this mixture, 708.90 g colloidal silica, (Ludox™ AS-40, 40% $SiO_2$) was added, followed by the addition of 0.92 g de-ionized water. The reaction mixture was homogenized for 1 hour with a high-speed mechanical stirrer, and then aged in several Teflon™ bottles overnight at 95° C. After the aging step, the reaction mixture was recombined and analyzed. The analysis indicated a content of 7.00% silicon by weight.

A 1000 g portion of this reaction mixture was combined with a mixed TMACl/NaCl solution (14.0 g TMACl (97%) and 7.46 g of NaCl dissolved in 100.0 g de-ionized water) while applying vigorous mixing. After a half-hour of homogenization the reaction mixture was distributed among 5 Teflon™-lined autoclaves. The autoclaves were all placed in ovens set at 98° C. and 125° C., where the reaction mixtures were reacted for 13 days at 98° C. and at 7 and 8 days at 125° C. at autogenous pressures. The solid products were recovered by centrifugation, washed with de-ionized water, and dried at 95° C.

The composition of the product isolated from the 13 day/98° C. preparation consisted of the mole ratios Si/Al= 5.78, Na/Al=0.37, N/Al=1.08, and C/N=5.92. Powder X-ray diffraction (XRD) showed all of the materials to be UZM-9. Characteristic lines in the XRD pattern are given in Table 1.

TABLE 1

| 2θ | d (Å) | I/$I_o$ |
|---|---|---|
| 7.34 | 12.03 | vs |
| 10.40 | 8.50 | m |
| 12.74 | 6.94 | s |
| 14.74 | 6.01 | w |
| 16.48 | 5.37 | w–m |
| 18.08 | 4.90 | w |
| 20.90 | 4.25 | m |
| 22.18 | 4.00 | vs |
| 23.42 | 3.80 | w |
| 24.58 | 3.62 | vs |
| 26.76 | 3.33 | m |
| 27.78 | 3.21 | m |
| 30.68 | 2.91 | m |
| 31.58 | 2.83 | m |
| 33.32 | 2.69 | w |
| 34.22 | 2.62 | w |
| 35.04 | 2.56 | m |
| 36.64 | 2.45 | w |
| 37.42 | 2.40 | w |
| 38.94 | 2.31 | w |

TABLE 1-continued

| 2θ | d (Å) | I/I$_o$ |
|---|---|---|
| 41.16 | 2.19 | w |
| 42.56 | 2.12 | w |
| 45.26 | 2.00 | w |
| 48.54 | 1.87 | w |
| 49.14 | 1.85 | w |

Example 2

An aluminosilicate reaction mixture was prepared by mixing 49.54 g of aluminum sec-butoxide (95+%) with a combination of 213.21 g TEAOH solution (35%) and 75.38 g DEDMAOH solution (20%) with vigorous stirring. This was followed by the addition of 269.31 g of TEOS (98%) and further homogenization. The reaction mixture was then distilled at 95° C. for 2 hours to remove solvent. The reaction mixture was allowed to cool and was found to contain 9.85% Si by elemental analysis. A 280 g portion of this reaction mixture was placed in a Teflon™ beaker and mixed vigorously with a mechanical stirrer. A solution containing 6.48 g TMACl (97%), and 3.45 g NaCl dissolved in 90 g distilled water was then added slowly to the aluminosilicate reaction mixture and the reaction mixture was homogenized for an additional hour. The reaction mixture was then transferred to a Teflon™ bottle and digested for 10 days in a 98° C. oven. The solid products were recovered by centrifugation, washed with de-ionized water, and dried at 95° C.

Analysis by powder x-ray diffraction showed the product to have the UZM-9 structure. Characteristic lines in the x-ray diffraction pattern are shown below in Table 2. The product was found to have mole ratios as determined by elemental analysis of: Si/Al=5.48, Na/Al =0.17, N/Al=0.98, and C/N=5.36. To determine the organoammonium species present in the product, ion-chromatography was performed on a portion of the product which had been dissolved in aqueous HF. The results showed that sodium, TMA, TEA, and DEDMA cations were present in the product. A portion of the product was calcined under a flow of nitrogen for 6 hours at 520° C. The BET surface area of the calcined material was 575 m$^2$/g and the micropore volume was 0.25 cc/g.

TABLE 2

| 2-θ | d(Å) | I/I$_o$ |
|---|---|---|
| 7.34 | 12.03 | vs |
| 10.40 | 8.50 | m |
| 12.74 | 6.94 | s |
| 14.757 | 6.00 | w |
| 16.50 | 5.37 | w–m |
| 18.08 | 4.90 | w |
| 20.90 | 4.25 | m |
| 22.20 | 4.00 | vs |
| 23.38 | 3.80 | w |
| 24.60 | 3.62 | vs |
| 26.78 | 3.33 | m |
| 27.80 | 3.21 | m |
| 30.70 | 2.91 | m |
| 31.66 | 2.82 | w |
| 33.36 | 2.68 | w |
| 34.24 | 2.62 | w |
| 35.06 | 2.56 | m |
| 36.70 | 2.45 | w |
| 37.44 | 2.40 | w |
| 38.96 | 2.31 | w |

TABLE 2-continued

| 2-θ | d(Å) | I/I$_o$ |
|---|---|---|
| 41.20 | 2.19 | w |
| 42.56 | 2.12 | w |
| 45.24 | 2.00 | w |
| 48.56 | 1.87 | w |
| 49.16 | 1.85 | w |

Example 3

An aluminosilicate reaction mixture was prepared by adding 33.83 g of Al(Osec-Bu)$_3$ (95+%) to a combination of 184.95 g of a TEAOH solution (35%) and 65.39 g of a DEDMAOH solution (20%) with vigorous stirring followed by the addition of 74.35 g of Ultrasil™ VN SP (85%) silica. To this mixture a solution containing 7.53 g TMACl (97%), and 3.38 g NaCl dissolved in 30.56 g distilled water was slowly added to the aluminosilicate mixture with mixing and then homogenized for 30 minutes with a high-speed stirrer. The mixture was crystallized at 98° C. for 10 days at autogenous pressures. The solid products were isolated by centrifugation, washed with de-ionized water, and dried at 95° C.

Analysis by powder x-ray diffraction showed the product to have the UZM-9 structure. Characteristic lines observed for the product are given in Table 3 below. The product had the following mole ratios as determined by elemental analysis: Si/Al=4.83, Na/Al=0.35, N/Al=0.76, and C/N=6.24. A portion of the product was calcined under a flow of nitrogen for 6 hours at 520° C., after which it was found to have a BET surface area of 573 m$^2$/g and a micropore volume of 0.29 cc/g.

TABLE 3

| 2-θ | d(Å) | I/I$_o$ |
|---|---|---|
| 7.32 | 12.07 | s |
| 10.36 | 8.53 | m |
| 12.70 | 6.96 | s |
| 14.70 | 6.02 | w |
| 16.46 | 5.38 | w |
| 18.04 | 4.91 | w |
| 20.88 | 4.25 | m |
| 22.16 | 4.01 | vs |
| 23.38 | 3.80 | w |
| 24.54 | 3.62 | vs |
| 26.70 | 3.34 | m |
| 27.74 | 3.21 | m |
| 30.66 | 2.91 | m |
| 31.54 | 2.83 | w–m |
| 33.30 | 2.69 | w |
| 34.16 | 2.62 | w |
| 34.98 | 2.56 | m |
| 36.56 | 2.46 | w |
| 37.36 | 2.40 | w |
| 38.92 | 2.31 | w |
| 41.10 | 2.19 | w |
| 42.54 | 2.12 | w |
| 45.24 | 2.00 | m |
| 48.46 | 1.88 | w |
| 49.10 | 1.85 | w |

Example 4

An aluminosilicate reaction mixture was prepared by mixing 145.14 g of aluminum sec-butoxide (95+%), with a combination of 595.04 g of a TEAOH solution (35%) and 560.99 g of a DEDMAOH solution (20%) with vigorous stirring. To this mixture, 698.99 g colloidal silica, (Ludox™

AS-40, 40% $SiO_2$) was added and the resulting mixture homogenized for 1 hour with a high-speed mechanical stirrer, and then aged in Teflon™ bottles overnight at 95° C. After the aging step, the reaction mixture was recombined and analyzed, the analysis indicating a silicon content of 6.96 wt. %.

To 1693 g of the above reaction mixture there was added a mixed TMACl/NaCl solution (29.55 g TMACl (97%) and 15.76 g of NaCl dissolved in 200 g distilled water) with mixing. After a half-hour of homogenization, 15.76 g of seeds UZM-9 from example 2 was added to the reaction mixture. After further homogenization, the reaction mixture was transferred to Teflon™ bottles and digested for 9 days at 98° C. The solid products were recovered by centrifugation, washed with de-ionized water, and dried at 95° C.

The isolated products were found to have the following mole ratios: Si/Al=4.62; Na/Al=0.37; N/Al=0.78; and C/N=5.78. The BET surface area of the calcined material was 603 $m^2/g$ while the micropore volume was 0.30 cc/g. Characterization of the as-synthesized material by powder X-ray diffraction (XRD) showed that the material was UZM-9. Characteristic lines are given in Table 4.

TABLE 4

| 2-θ | d(Å) | I/I$_0$ |
|---|---|---|
| 7.36 | 12.00 | s |
| 10.42 | 8.48 | m |
| 12.76 | 6.93 | s |
| 14.76 | 6.00 | w |
| 16.52 | 5.36 | w |
| 18.06 | 4.91 | w |
| 20.92 | 4.24 | m |
| 22.20 | 4.00 | vs |
| 23.42 | 3.80 | w |
| 24.58 | 3.62 | vs |
| 26.76 | 3.33 | m |
| 27.78 | 3.21 | m |
| 30.68 | 2.91 | m |
| 31.60 | 2.83 | m |
| 33.34 | 2.69 | w |
| 34.20 | 2.62 | w |
| 35.00 | 2.56 | m |
| 36.62 | 2.45 | w |
| 37.40 | 2.40 | w |
| 38.92 | 2.31 | w |
| 41.16 | 2.19 | w |
| 42.56 | 2.12 | w |
| 45.28 | 2.00 | w–m |
| 48.50 | 1.88 | w |
| 49.12 | 1.85 | w |

Example 5

An aluminosilicate reaction mixture was prepared by adding 182.58 g of Al(Osec-Bu)$_3$ (95+%) to the combination of 548.94 g of a TEAOH solution (35%) and 529.29 g of a DEDMAOH solution (20%) with vigorous stirring, followed by the addition of 404.89 g Hi-Sil™ 250 (88%) silica. Then a solution containing 135.14 g TMAOH (25%), and 14.83 g NaOH dissolved in 184.33 g distilled water was added slowly to the aluminosilicate reaction mixture with mixing, and the mixture was further homogenized for 60 minutes with a high-speed stirrer. Next, 17.81 g of UZM-9 seeds was added and the resulting mixture homogenized for another 10 minutes. The mixture was crystallized at 98° C. for 6 days at autogenous pressures. The solid products were isolated by centrifugation, washed with distilled water, and dried at 95° C.

Analysis by powder x-ray diffraction showed the product to have the UZM-9 structure. Characteristic lines in the x-ray diffraction pattern are shown in Table 5. Elemental analysis showed that the product had mole ratios of: Si/Al=4.54, Na/Al=0.43, N/Al=0.67, and C/N=5.83. A portion of the product was calcined under a flow of nitrogen for 6 hours at 520° C. The BET surface area of the calcined material was 594 $m^2/g$ and the micropore volume was 0.31 cc/g.

TABLE 5

| 2-θ | d(Å) | I/I$_0$ |
|---|---|---|
| 7.36 | 12.01 | vs |
| 10.40 | 8.50 | m |
| 12.76 | 6.93 | s |
| 14.74 | 6.00 | w |
| 16.50 | 5.37 | w |
| 18.04 | 4.91 | w |
| 20.92 | 4.24 | m |
| 22.18 | 4.00 | vs |
| 23.40 | 3.80 | w |
| 24.56 | 3.62 | vs |
| 26.76 | 3.33 | m |
| 27.78 | 3.21 | m |
| 30.66 | 2.91 | m |
| 31.58 | 2.83 | m |
| 33.32 | 2.69 | w |
| 34.20 | 2.62 | w |
| 35.00 | 2.56 | m |
| 36.64 | 2.45 | w |
| 37.42 | 2.40 | w |
| 38.96 | 2.31 | w |
| 41.12 | 2.19 | w |
| 42.50 | 2.13 | w |
| 45.28 | 2.00 | w–m |
| 48.46 | 1.88 | w |
| 49.14 | 1.85 | w |

Example 6

An aluminosilicate reaction mixture was prepared by adding 9.05 g of Al(OH)$_3$ with vigorous stirring to a mixture consisting of 67.83 g of a solution of TEAOH (35%) and 65.41 g of a solution of DEDMAOH (20%). This was followed by the addition of 50.03 g of Hi-Sil™ 250 (88%) silica and then a solution containing 16.70g TMAOH (25%), and 1.81 g NaOH dissolved in 39.16 g distilled water. The resultant mixture was further homogenized for 30 minutes with a high-speed stirrer and then divided among seven Teflon™-lined autoclaves and the mixtures reacted at 125° C. and 150° C. for 1,2 and 3 days at autogenous pressures. The solid products were isolated by centrifugation, washed with de-ionized water, and dried at 95° C.

Analysis by powder x-ray diffraction showed the products to have the UZM-9 structure. Representative lines observed in the XRD pattern are given in Table 6. The product resulting from the 150° C. and 3 day reaction had the following mole ratios as determined by elemental analysis: Si/Al=5.2; Na/Al=0.35; N/Al=0.75; and C/N=5.61.

TABLE 6

| 2-θ | d(Å) | I/I$_0$ |
|---|---|---|
| 7.38 | 11.97 | vs |
| 10.46 | 8.45 | m |
| 12.80 | 6.91 | s |
| 14.78 | 5.99 | w |
| 16.56 | 5.35 | w |
| 18.14 | 4.89 | w |
| 20.94 | 4.24 | m |
| 22.24 | 3.99 | vs |
| 23.50 | 3.78 | w |
| 24.64 | 3.61 | vs |

TABLE 6-continued

| 2-θ | d(Å) | I/I₀ |
|---|---|---|
| 26.82 | 3.32 | m |
| 27.84 | 3.20 | m |
| 30.74 | 2.91 | m |
| 31.66 | 2.82 | w–m |
| 33.40 | 2.68 | w |
| 34.30 | 2.61 | w |
| 35.08 | 2.56 | m |
| 36.76 | 2.44 | w |
| 37.46 | 2.40 | w |
| 39.05 | 2.30 | w |
| 41.20 | 2.19 | w |
| 42.64 | 2.12 | w |
| 45.36 | 2.00 | w–m |
| 48.58 | 1.87 | w |
| 49.22 | 1.85 | w |

Example 7

An aluminosilicate reaction mixture was prepared by mixing 97.05 g of aluminum sec-butoxide (95+%) and 490.72 g of a solution of TEAOH (35%) with vigorous stirring. To this mixture, 411.30 g colloidal silica, (Ludox™ AS-40, 40% SiO₂) was added, followed by the addition of 0.94 g distilled water. The reaction mixture was homogenized for 1 hour with a high-speed mechanical stirrer, and then aged in Teflon™ bottles overnight at 98° C. After the aging step, the reaction mixture was recombined and analyzed, the analysis indicated a silicon content of 8.25 wt. %.

A 300 g portion of the above reaction mixture was treated with a solution consisting of 23.26 g TMAOH (25%) and 2.56 g of NaOH dissolved in 50.0 g distilled water with vigorous mixing. After a half-hour of homogenization the reaction mixture was distributed among 5 Teflon™-lined autoclaves and the mixtures reacted at 98° C. for 3 days at autogenous pressures. The solid products were recovered by centrifugation, washed with de-ionized water, and dried at 95° C.

The products were analyzed and found to have mole ratios of Si/Al=3.88; Na/Al=0.45; N/Al=0.63; and C/N=5.66. Characterization by powder x-ray diffraction showed that the product was UZM-9. Representative lines observed in the XRD pattern are given in Table 7.

TABLE 7

| 2-θ | d(Å) | I/I₀ |
|---|---|---|
| 7.32 | 12.07 | vs |
| 10.38 | 8.52 | m |
| 12.70 | 6.96 | s |
| 14.68 | 6.03 | w |
| 16.46 | 5.38 | w–m |
| 18.02 | 4.92 | w |
| 20.84 | 4.26 | m |
| 22.12 | 4.02 | vs |
| 23.34 | 3.81 | w |
| 24.50 | 3.63 | vs |
| 26.68 | 3.34 | m |
| 27.72 | 3.22 | m |
| 30.58 | 2.92 | m |
| 31.48 | 2.84 | m |
| 33.21 | 2.70 | w |
| 34.10 | 2.63 | w |
| 34.92 | 2.57 | m |
| 36.54 | 2.46 | w |
| 37.30 | 2.41 | w |

TABLE 7-continued

| 2-θ | d(Å) | I/I₀ |
|---|---|---|
| 38.84 | 2.32 | w |
| 41.00 | 2.20 | w |
| 42.40 | 2.13 | w |
| 45.18 | 2.01 | w |
| 48.36 | 1.88 | w |
| 48.96 | 1.86 | w |

Example 8

An aluminosilicate reaction mixture was prepared by adding 43.42 g Al(Osec-Bu)₃ to 446.26 g MTEAOH (20%) with stirring. To this mixture, 201.22 g colloidal silica, (Ludox™ AS-40, 40% SiO₂) was added, followed by the addition of 9.07 g distilled water. The reaction mixture was homogenized for 1 hour, and then aged in Teflon™ bottles for approximately 3.5 days at 95° C. After the aging step, the reaction mixture was analyzed, and the analysis indicated a silicon content of 5.71 wt. %.

Into a container, 103.95g of the above mixture were mixed with a solution containing 1.62 g TMACl (97%) and 0.82 g NaCl in 3.61 g of deionized water. After 15 minutes of homogenization, the reaction mixture was divided among three Teflon™-lined autoclaves and one Teflon™ FEP bottle. The reaction mixtures in the autoclaves were reacted at 125° C. for 7, 10, and 14 days while that in the bottle was reacted at 100° C. for 14 days. All reactions were carried out at autogenous pressures. The solid products were isolated by filtration, washed with de-ionized water, and dried at 50° C.

The products of all of the reactions exhibited the x-ray diffraction pattern of UZM-9. Elemental analysis of the product from the 125° C./7 day digestion revealed compositional mole ratios of: Si/Al=5.08; Na/Al=0.26; N/Al=0.76; and C/N=5.62. Representative lines in the x-ray diffraction pattern of this product are given in Table 8.

TABLE 8

| 2-θ | d(Å) | I/I₀ |
|---|---|---|
| 7.34 | 12.04 | vs |
| 10.40 | 8.50 | m |
| 12.74 | 6.94 | s |
| 14.74 | 6.01 | w |
| 16.50 | 5.37 | w |
| 18.08 | 4.90 | w |
| 20.88 | 4.25 | m |
| 22.18 | 4.00 | vs |
| 23.42 | 3.80 | w |
| 24.56 | 3.62 | vs |
| 26.74 | 3.33 | m |
| 27.78 | 3.21 | m |
| 30.68 | 2.91 | m |
| 31.56 | 2.83 | m |
| 33.34 | 2.69 | w |
| 34.20 | 2.62 | w |
| 35.02 | 2.56 | m |
| 36.62 | 2.45 | w |
| 37.42 | 2.40 | w |
| 38.93 | 2.31 | w |
| 41.14 | 2.19 | w |
| 42.56 | 2.12 | w |
| 45.28 | 2.00 | m |
| 48.50 | 1.88 | w |
| 49.16 | 1.85 | w |

Example 9

An aluminosilicate reaction mixture was prepared by mixing 13.88 g aluminum isopropoxide (98%) and 420.24 g of a TEAOH solution (35%), to which there were added 7.52 g TMACl (97%) and the mixture stirred for 2 hours. Then 200.00 g colloidal silica (Ludox™ AS-40, 40% SiO₂) was added and the reaction mixture was homogenized for 2 hours and aged in a Teflon™ bottle overnight at 100° C. After cooling to room temperature, the resulting mixture was divided into 5 portions of equal weight for 5 different reactions.

To one of these portions a CsCl solution (1.12 g cesium chloride in 3.8 g water) was added dropwise with vigorous stirring. The resulting mixture was transferred to two Teflon™-lined autoclaves and the mixtures reacted at 125° C. for 3 and 5 days. The solid products were recovered by centrifugation, washed with de-ionized water, and dried at 95° C.

Characterization by powder X-ray diffraction (XRD) showed similar patterns, which were identified as UZM-9. Representative lines in the XRD pattern are given in Table 9. The sample digested for 3 days was analyzed and found to have mole ratios of: Si/Al=5.23; Cs/Al=0.34; N/Al=0.75; and C/N=6.44.

TABLE 9

| 2-θ | d(Å) | I/I₀ |
|---|---|---|
| 7.32 | 12.07 | m |
| 10.40 | 8.50 | m |
| 12.70 | 6.96 | w |
| 14.74 | 6.00 | m |
| 16.48 | 5.37 | w–m |
| 20.88 | 4.25 | w |
| 22.18 | 4.00 | m |
| 23.37 | 3.80 | w |
| 24.58 | 3.62 | vs |
| 26.76 | 3.33 | m |
| 27.74 | 3.21 | w |
| 30.70 | 2.91 | m |
| 31.58 | 2.83 | w |
| 32.54 | 2.75 | w |
| 34.23 | 2.62 | w |
| 35.00 | 2.56 | w |
| 36.68 | 2.45 | w |
| 42.58 | 2.12 | w |
| 45.32 | 2.00 | w |
| 48.54 | 1.87 | w |
| 49.18 | 1.85 | w |

Example 10

An aluminosilicate reaction mixture was prepared by mixing 20.75 g of aluminum sec-butoxide (95+%) and 368.57 g of a DEDMAOH solution (20%) with vigorous stirring. To this mixture, 110.57 g colloidal silica (Ludox™ AS-40, 40% SiO₂) was added. The reaction mixture was homogenized for 20 min and then aged in Teflon™ bottles overnight at 95° C. After the aging step, the reaction mixture was analyzed, and found to contain 4.94 wt. % silicon.

A 18.39 g portion of this reaction mixture was mixed with a solution consisting of 0.36 g TMACl (97%) and 0.08 g NaCl dissolved in 1.16 g deionized water. After a half-hour of homogenization the reaction mixture was transferred to a Teflon™-lined autoclave and the mixture reacted at 125° C. for days at autogenous pressure. The solid product was recovered by centrifugation, washed with de-ionized water, and dried at 95° C.

The composition of the isolated product consisted of the mole ratios: Si/Al=3.6 and Na/Al=0.42 as determined by elemental analysis. Characterization by powder x-ray diffraction (XRD) showed the material to be UZM-9. Representative lines in the XRD pattern are given in Table 10.

TABLE 10

| 2-θ | d(Å) | I/I₀ |
|---|---|---|
| 7.32 | 12.07 | vs |
| 10.38 | 8.52 | m–s |
| 12.72 | 6.95 | s |
| 14.70 | 6.02 | w |
| 16.46 | 5.38 | w |
| 18.02 | 4.92 | w |
| 20.84 | 4.26 | m |
| 22.12 | 4.02 | vs |
| 23.34 | 3.81 | w |
| 24.50 | 3.63 | vs |
| 26.66 | 3.34 | m |
| 27.70 | 3.22 | m |
| 30.57 | 2.92 | m |
| 31.50 | 2.84 | m |
| 33.21 | 2.70 | w |
| 34.08 | 2.63 | w |
| 34.92 | 2.57 | m |
| 36.52 | 2.46 | w |
| 37.30 | 2.41 | w |
| 38.82 | 2.32 | w |
| 41.00 | 2.20 | w |
| 42.40 | 2.13 | w |
| 45.14 | 2.01 | w–m |
| 48.34 | 1.88 | w |
| 48.98 | 1.86 | w |

Example 11 (Comparative Example)

An aluminosilicate reaction mixture was prepared by mixing 25.33 g of aluminum sec-butoxide (95+%) and 149.99 g of a solution of TMAOH (25%) with vigorous stirring. To this mixture 121.99 g colloidal silica (Ludox™ AS-40, 40% SiO₂) was added, followed by the addition of 2.68 g distilled water. The reaction mixture was homogenized for 1 hour and then aged in Teflon™ bottles overnight at 98° C. After the aging step, the reaction mixture was recombined and analyzed, the analysis indicated a silicon content of 8.64 wt. %.

A 50 g portion of this reaction mixture was placed in a Teflon™-lined autoclave and digested for 5 days at 98° C. The solid product was recovered by centrifugation, washed with de-ionized water, and dried at 95° C. Characterization by powder X-ray diffraction (XRD) showed the lines in the pattern to be those for sodalite.

Example 12 (Comparative Example)

An aluminosilicate reaction mixture was prepared by adding 9.22 g of aluminum sec-butoxide (95+%), to 54.57 g of a TMAOH solution (25%) with vigorous stirring, followed by the addition of 20.44 g of Hi-Sil™ 250 (88%) silica. Then a solution containing 2.05 TMACl (97%), and 1.09 g NaCl dissolved in 22.63 g distilled water was added slowly with mixing. The mixture was homogenized for 30 minutes, divided among two Teflon™-lined autoclaves and the mixtures reacted at 98° C. and 125° C. for 2 and 5 days respectively. The solid products were isolated by centrifugation, washed with de-ionized water, and dried at 95° C.

Analysis by powder x-ray diffraction showed both products to consist of sodalite with just a trace of material with the LTA topology in the 98° C. material.

Example 13

The thermal stability of UZM-9 in the as-synthesized and proton form is demonstrated in the following example. An 8 g sample from Example 3 was calcined for 6 hr at 520° C., the first 2 hours in a nitrogen atmosphere, which was converted to an air flow for the last 4 hr. A 6 g portion of this calcined sample was ammonium exchanged 3 times at 75° C. using a 1 M NH$_4$Cl solution. The exchanged material was then calcined at 550° C. for 2 hr to generate the proton form. X-ray diffraction patterns were obtained for each sample and are presented in the Figure. The as-synthesized sample is shown in the pattern marked (a), the calcined form in the pattern marked (b), and the proton form shown in the pattern marked (c), all on the same intensity scale, but offset for clarity. It is easily seen that the UZM-9 composition retains its crystallinity with both calcination or further conversion to the proton form. Variations of particular line intensities are likely due to the changing composition of the zeolite with treatment and not degradation of the structure. Thus, the as-synthesized zeolite (a) contains Na and TMA, DEDMA, and TEA templates and has the most intense first peak at 2θ=7.32°; the calcined zeolite (b) contains Na and protons and has the most intense second peak at 2θ=10.56°; and sample (c) only contains protons as the charge balancing species and has the most intense third peak at 2θ=12.86°.

Example 14

It is well known in the art that changing the Si/Al ratio in zeolites changes the acid site density and distribution. This example demonstrates that UZM-9 can function as an acid catalyst. Samples from Example 5, Example 3 and Example 6 were tested for cracking activity as follows. First, 10 g of each sample was calcined at 520° C. for 6 hours, initially under a nitrogen gas flow for 2 hr, which was switched to an air flow for the remainder of the calcination. The calcined materials were exchanged twice in 1 M ammonium chloride solution at 75° C. The samples were then converted to the proton form for testing by calcination at 550° C. for 2 hr. Into an electrically heated reactor there were placed 250 mg of a sample and the sample was dried for 30 minutes at 200° C. followed by 60 minutes at 550° C. in flowing hydrogen. The feedstream used to test each sample consisted of hydrogen saturated with heptane at 0° C. and atmospheric pressure. The feedstream was flowed through the sample at a rate of 125 cc/min. The effluent gas stream was analyzed using a gas chromatograph. The product stream was sampled at the following temperatures/times on stream: 25° C./0 hour, 450° C./0.33 hours, 500° C./1.10 hours and 1.45, and 550° C./2.20 hours and 2.55 hours. For comparison, a steam stabilized Y zeolite (SSY) was also tested. The selectivities to the major products for each sample are given in Table 11 for the last data point collected at 550° C. The data show that UZM-9 is comparable to SSY in ability to convert heptane.

TABLE 12

| Sample | SSY | Example 6 | Example 5 | Example 3 |
|---|---|---|---|---|
| Temperature | 550° C. | 550° C. | 550° C. | 550° C. |
| Time on Stream (hr.) | 2.55 | 2.55 | 2.55 | 2.55 |
| Heptane conversion | 44.42 | 35.18 | 48.05 | 41.37 |
| Product composition based on GC | | | | |
| Methane | 0.58 | 1.55 | 2.89 | 2.03 |
| Ethane | 3.21 | 3.16 | 5.39 | 4.03 |
| Propane | 7.14 | 17.03 | 24.18 | 20.24 |
| Isobutane | 9.9 | 2.27 | 2.99 | 2.86 |
| n-Butane | 8.61 | 8.36 | 9.51 | 9.23 |
| Isopentane | 1.72 | 0.79 | 0.65 | 0.73 |
| n-Pentane | 1.18 | 1.24 | 1.61 | 1.4 |

TABLE 12-continued

| Benzene | 0.19 | 0.0 | 0.0 | 0.04 |
|---|---|---|---|---|
| Heptane | 55.58 | 64.82 | 51.95 | 58.63 |
| Toluene | 1.75 | 0.12 | 0.27 | 0.27 |

We claim as our invention:

1. A microporous crystalline zeolite having a three dimensional framework of at least AlO$_2$ and SiO2 tetrahedral units and an empirical composition on an as synthesized and anhydrous basis expressed by an empirical formula of:

$$M_m^{n+}R_r^{p+}Al_{1-x}E_xSi_yO_z$$

where M is at least one exchangeable cation selected from the group consisting of alkali and alkaline earth metals, "m" is the mole ratio of M to (Al+E) and varies from 0 to about 0.95, R is at least two organic cations selected from the group consisting of quaternary ammonium ions, diquaternary ammonium ions, protonated amines, protonated alkanolamines and quaternized alkanolammonium ions and further where at least one of said organic cations contains at least one organic group having at least two carbon atoms, "r" is the mole ratio of R to (Al+E) and has a value of about 0.5 to about 1.5, "n" is the weighted average valence of M and has a value of about 1 to about 2, "p" is the weighted average valence of R and has a value of about 1 to about 2, E is an element selected from the group consisting of gallium, iron, boron and mixtures thereof, "x" is the mole fraction of E and has a value from 0 to about 0.5, "y" is the mole ratio of Si to (Al+E) and varies from greater than 3.5 to about 6 and "z" is the mole ratio of O to (Al+E) and has a value determined by the equation:

$$z=(m\cdot n+r\cdot p+3+4\cdot y)/2$$

and is characterized in that it has the x-ray diffraction pattern having at least the d spacings and intensities set forth in Table A:

TABLE A

| 2-θ | d(Å) | I/I$_0$ % |
|---|---|---|
| 7.30–7.42 | 11.9–12.1 | m–vs |
| 10.3–10.52 | 8.4–8.58 | m–s |
| 12.65–12.86 | 6.88–6.99 | w–s |
| 14.61–14.85 | 5.96–6.06 | w–m |
| 16.37–16.65 | 5.32–5.41 | w–m |
| 20.74–21.03 | 4.22–4.28 | w–m |
| 21.98–22.38 | 3.97–4.04 | m–vs |
| 23.2–23.64 | 3.76–3.83 | w |
| 24.37–24.78 | 3.59–3.65 | vs |
| 26.51–27.00 | 3.3–3.36 | m |
| 27.51–28.04 | 3.18–3.24 | w–m |
| 30.48–30.81 | 2.9–2.93 | m |
| 31.36–31.82 | 2.81–2.85 | w–m |
| 32.17–33.80 | 2.65–2.78 | w |
| 33.80–34.60 | 2.59–2.65 | w |
| 34.6–35.31 | 2.54–2.59 | w–m |
| 36.19–37.12 | 2.42–2.48 | w |
| 36.96–37.77 | 2.38–2.43 | w |
| 44.83–45.79 | 1.98–2.02 | w–m |
| 48.1–48.93 | 1.86–1.89 | w |
| 48.65–49.5 | 1.84–1.87 | w |

2. The zeolite of claim 1 where M is selected from the group consisting of sodium, cesium, lithium, potassium and mixtures thereof.

3. The zeolite of claim 1 where R is selected from the group consisting of tetramethylammonium, tetraethylammonium, diethyldimethylammonium, methyltriethylammonium, hexamethonium, decamethonium ions and mixtures thereof.

4. The zeolite of claim 1 where R is a mixture of tetramethylammonium, tetraethylammonium and diethyldimethylammonium ions.

5. The zeolite of claim 1 where "r" has a value of about 0.5 to about 1.2.

6. The zeolite of claim 1 where M is exchanged for a different secondary cation (M') selected from the group consisting of alkali metals, alkaline earth metals, rare earth metals, hydronium ion, ammonium ion and mixtures thereof.

7. A process for preparing a microporous crystalline zeolite having a three dimensional framework of at least $AlO_2$ and $SiO_2$ tetrahedral units and an empirical composition on an as synthesized and anhydrous basis expressed by an empirical formula of:

$$M_m^{n+}R_r^{p+}Al_{1-x}E_xSi_yO_z$$

where M is at least one exchangeable cation selected from the group consisting of alkali and alkaline earth metals, "m" is the mole ratio of M to (Al+E) and varies from 0 to about 0.95, R is at least two organic cations selected from the group consisting of quaternary ammonium ions, diquaternary ammonium ions, protonated amines, piotonated alkanolamines and quaternized alkanolammonium ions and further where at least one of said organic cations contains at least one organic group having at least two carbon atoms, "r" is the mole ratio of R to (Al+E) and has a value of about 0.5 to about 1.5, "n" is the weighted average valence of M and has a value of about 1 to about 2, "p" is the weighted average valence of R and has a value of about 1 to about 2, E is an element selected from the group consisting of gallium, iron, boron and mixtures thereof, "x" is the mole fraction of E and has a value from 0 to about 0.5, "y" is the mole ratio of Si to (Al+E) and varies from greater than 3.5 to about 6 and "z" is the mole ratio of O to (Al+E) and has a value determined by the equation:

$$z = (m \cdot n + r \cdot p + 3 + 4 \cdot y)/2$$

and is characterized in that it has the x-ray diffraction pattern having at least the d spacings and intensities set forth in Table A:

TABLE A

| 2-θ | d(Å) | I/I₀ % |
|---|---|---|
| 7.30–7.42 | 11.9–12.1 | m–vs |
| 10.3–10.52 | 8.4–8.58 | m–s |
| 12.65–12.86 | 6.88–6.99 | w–s |
| 14.61–14.85 | 5.96–6.06 | w–m |
| 16.37–16.65 | 5.32–5.41 | w–m |
| 20.74–21.03 | 4.22–4.28 | w–m |
| 21.98–22.38 | 3.97–4.04 | m–vs |
| 23.2–23.64 | 3.76–3.83 | w |
| 24.37–24.78 | 3.59–3.65 | vs |
| 26.51–27.00 | 3.3–3.36 | m |

TABLE A-continued

| 2-θ | d(Å) | I/I₀ % |
|---|---|---|
| 27.51–28.04 | 3.18–3.24 | w–m |
| 30.48–30.81 | 2.9–2.93 | m |
| 31.36–31.82 | 2.81–2.85 | w–m |
| 32.17–33.80 | 2.65–2.78 | w |
| 33.80–34.60 | 2.59–2.65 | w |
| 34.6–35.31 | 2.54–2.59 | w–m |
| 36.19–37.12 | 2.42–2.48 | w |
| 36.96–37.77 | 2.38–2.43 | w |
| 44.83–45.79 | 1.98–2.02 | w–m |
| 48.1–48.93 | 1.86–1.89 | w |
| 48.65–49.5 | 1.84–1.87 | w | the process comprising forming a reaction mixture containing reactive sources of M, R, Al, Si and optionally E and reacting the reaction mixture at a temperature of about 60° C. to about 175° C., under autogenous pressure and for a time sufficient to crystallize the microporous crystalline zeolite, the reaction mixture having a composition expressed in terms of mole ratios of the oxides of:

$$aM_{2/n}O:bR_{2/p}O:1-cAl_2O_3:cE_2O_3:dSiO_2:eH_2O$$

where "a" has a value of 0 to about 1.5, "b" has a value of about 1.0 to about 25, "c" has a value of 0 to about 0.5, "d" has a value of about 6 4 to about 50 and "e" has a value of about 25 to about 15000.

8. The process of claim 7 where M is selected from the group consisting of lithium, cesium, strontium, barium and mixtures thereof.

9. The process of claim 7 where the source of M is selected from the group consisting of halide, nitrate, sulfate, hydroxide, or acetate salts.

10. The process of claim 7 where R is selected from the group consisting of tetramethylammonium, tetraethylammonium, diethyldimethylammonium, methyltriethylammonium, hexamethonium, decamethonium ions and mixtures thereof.

11. The process of claim 7 where the source of R is the halide or hydroxide compounds of R.

12. The process of claim 7 where the aluminum source is selected from the group consisting of aluminum isopropoxide, aluminum sec-butoxide, precipitated alumina and aluminum metal.

13. The process of claim 7 where the silicon source is selected from the group consisting of tetraethylorthosilicate, silica sol, fumed silica, precipitated silica and mixtures thereof.

14. The process of claim 7 where the E sources are selected from the group consisting of alkali borates, boric acid, gallium oxyhydroxide, gallium sulfate, ferric sulfate, ferric chloride and mixtures thereof.

* * * * *

UNITED STATES PATENT AND TRADEMARK OFFICE
CERTIFICATE OF CORRECTION

PATENT NO. : 6,713,041 B1
DATED : March 30, 2004
INVENTOR(S) : Jaime G. Moscoso et al.

It is certified that error appears in the above-identified patent and that said Letters Patent is hereby corrected as shown below:

<u>Column 19,</u>
Line 25, replace "diquatemary" insert -- diquarternary --.
Line 26, replace "piotonated" with -- protonated --.

<u>Column 20,</u>
Line 19, replace "C." with -- C --.
Line 19, replace "C.," with -- C, --.

Signed and Sealed this

First Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,713,041 B1
DATED : March 30, 2004
INVENTOR(S) : Jaime G. Moscoso et al.

It is certified that error appears in the above-identified patent and that said Letters Patent is hereby corrected as shown below:

Column 19,
Line 37, replace "6" with -- 6; --.

Column 20,
Line 28, delete "6".

Signed and Sealed this

Nineteenth Day of April, 2005

JON W. DUDAS
*Director of the United States Patent and Trademark Office*